United States Patent [19]

Beson

[11] 4,377,273

[45] Mar. 22, 1983

[54] GATE VALVE HAVING A SECONDARY SEAL

[76] Inventor: John Beson, 10938 Leaning Ash, Houston, Tex. 77079

[21] Appl. No.: 235,120

[22] Filed: Feb. 17, 1981

[51] Int. Cl.³ .............................................. F16K 3/34
[52] U.S. Cl. .................................... 251/210; 251/328
[58] Field of Search ............... 251/159, 167, 168, 174, 251/210, 328

[56] References Cited

U.S. PATENT DOCUMENTS

| | | | |
|---|---|---|---|
| 2,194,261 | 3/1940 | Allen | 251/328 |
| 3,102,709 | 9/1963 | Allen | 251/210 X |
| 3,135,285 | 6/1964 | Volpin | 251/328 X |
| 3,321,176 | 5/1967 | Bolling | 251/174 X |

Primary Examiner—Harold W. Weakley
Attorney, Agent, or Firm—Carl B. Fox, Jr.

[57] ABSTRACT

Gate valve having a secondary seal, wherein the gate forms a metal to metal seal with the seat and wherein a resilient seal is moved toward the gate when the gate is in closed position to form a secondary fluid-tight seal with the gate, whereby leakage past the gate is effectively prevented.

8 Claims, 3 Drawing Figures

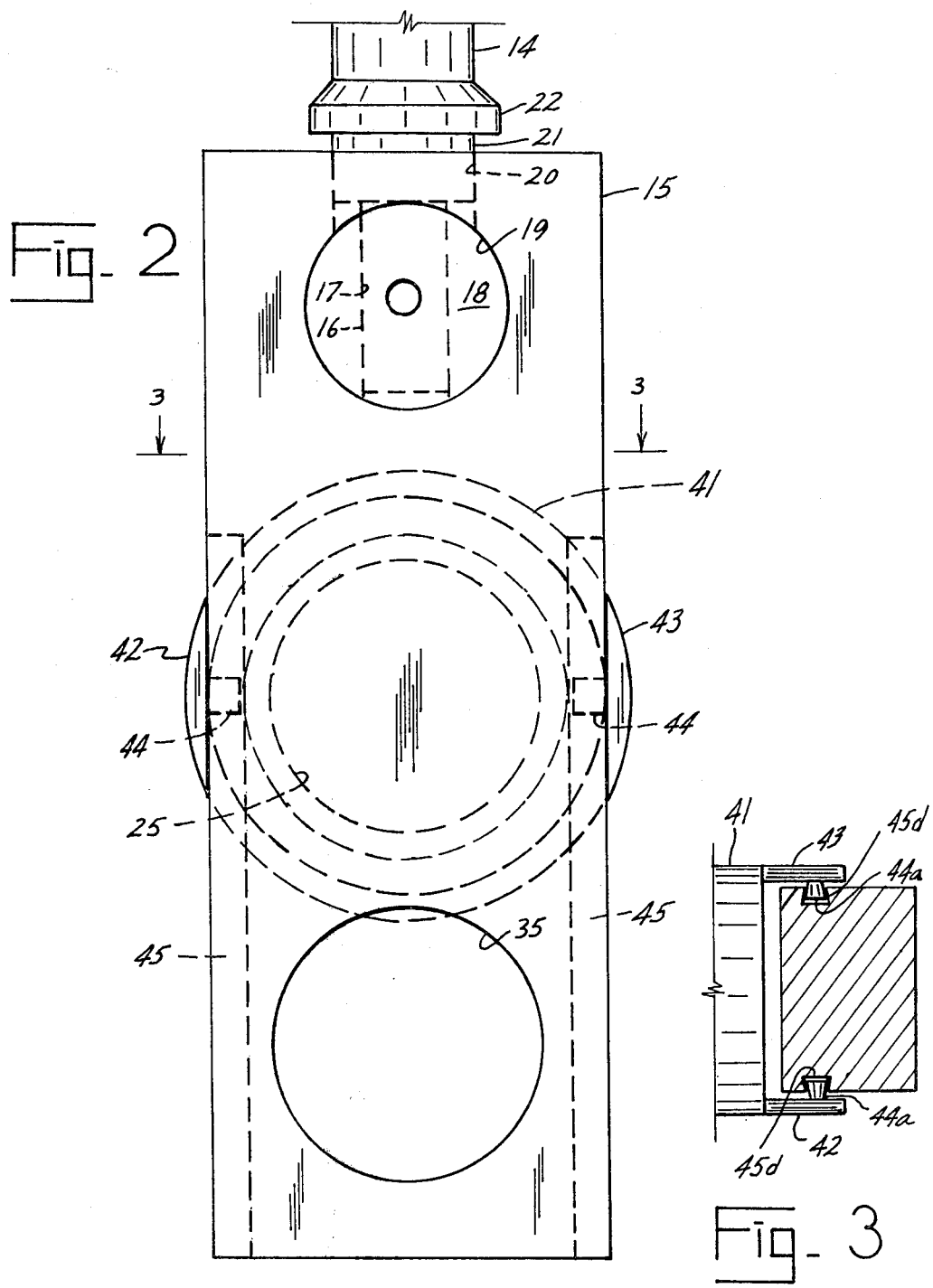

GATE VALVE HAVING A SECONDARY SEAL

BACKGROUND OF THE INVENTION

Gate valves serve very beneficial functions in many industries including the petroleum and chemicl industries. One attribute of gate valves is that the gate port may be made large so that a full opening through the valve is provided when the valve is opened. One problem frequently encountered in the case of gate valves is lack of formation of adequate seals between the gate or gates and the seat or seats, and gate valves are prone to leak unless adequate sealing means are provided. This invention seeks to provide an adequate seal for gate valves in the form of a positive cam actuated resilient secondary fluid seal.

SUMMARY OF THE INVENTION

The invention provides gate valves having metal to metal seals, which also have cam-actuated secondary seals in order that leakage of the valves may be adequately prevented. The secondary seals are automatically actuated upon closing of the valves so that no special consideration must be made during operation of the valves to insure effective operation of the secondary seals. The cam action which activates and deactivates the secondary seal is provided by interaction between slanted grooves in the opposite sides of the gate and pins carried by a seal support ring which constitutes the main body of the secondary seal mechanism. When the valve is closed, the pins, in combination with the gate grooves, cause movement of the secondary seal toward the gate so that it is automatically activated when the gate is closed. When the gate is opened, the pins, in combination with the grooves, cause deactivation of the secondary seal before the metal to metal seal is deactivated, so that the secondary seal is not subjected to high pressure differential which would tend to disrupt it.

A principal object of the invention is to provide gate valves having metal to metal seals and which include secondary seals actuated by cam action to be activated after formation of the metal to metal seal. A further object of the invention is to provide such gate valves wherein the secondary seal is activated and deactivated by a caming action between the secondary seal and the gate. Another object of the invention is to provide such gate valves which are dependable in operation, economical, and easily operated.

Other objects and advantages of the invention will appear from the following detailed description of preferred embodiments thereof, reference being made to the accompanying drawings.

BRIEF DESCRIPTIONS OF THE DRAWINGS

FIG. 2 is a vertical cross section taken at line 2—2 of FIG. 1.

FIG. 3 is a reduced horizontal cross section taken at line 3—3 of FIG. 2, showing a modified form of the apparatus.

DESCRIPTIONS OF THE PREFERRED EMBODIMENTS

Figure 1:
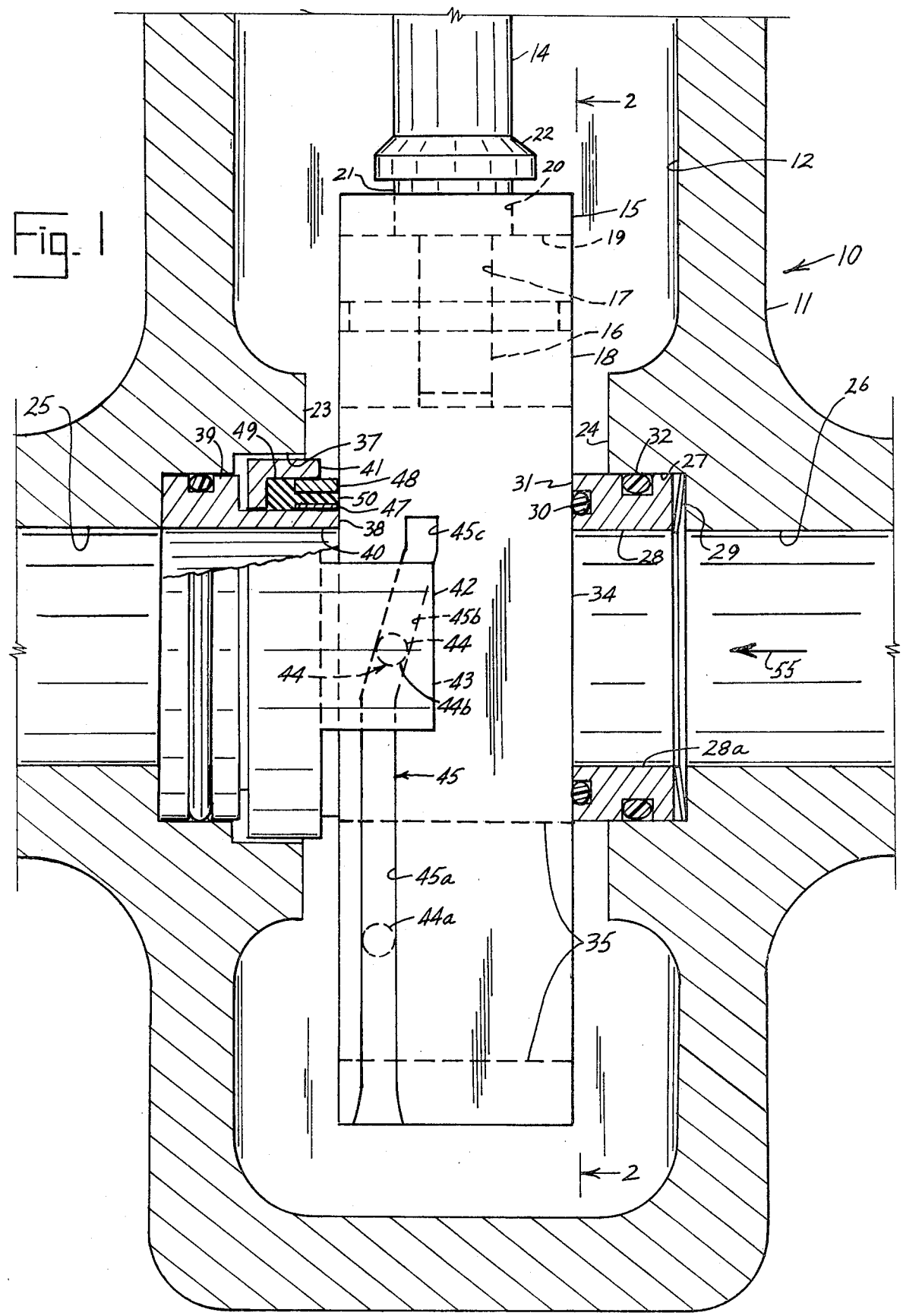
FIG. 1 is a vertical axial cross section showing a preferred embodiment of apparatus according to the invention.

Referring now to the drawings, and first to FIG. 1, gate valve 10 includes a valve body 11 which is hollow, having a valve chamber 12 therewithin. The upper or bonnet portion of the valve is not shown, a bonnet of any conventional form, providing a closure of the upper end of chamber 12 and forming a seal between valve body 11 and stem 14 being provided.

The valve is shown in the form of a rising stem gate valve, but the invention may be utilized equally suitably in non-rising stem gate valves. A single gate element 15 having rectangular surfaces is provided. Referring also to FIG. 2 of the drawings, the lower end of the stem is in a form of a threaded stud 16 which is screwed and pinned into tapped diametric opening 17 of a cylinder 18 which is received within a cylindrical opening 19 of the gate. An opening 20 receives cylindrical portion 21 of the stem, above which upwardly conical formation 22 is formed around stem 14 to provide a stop to prevent excessive upward movement of the stem by contact of formation 22 with the underside of the bonnet. The stem has a threaded engagement with a yoke nut, so that rotation of the nut causes longitudinal movements of the stem and the gate in either direction.

Two opposite formations 23, 24 project into chamber 12 of valve 10 around the inner ends of opposite aligned flow passages 25, 26 of valve body 11. A ring shaped annular recess 27 formed around flow passage 26 concentrically into formation 24 receives a seat element 28, which is in the form of a short cylindrical tubular ring, a Belleville spring 29 being disposed at the bottom of recess 27 to engage between the recess and the righthand side of seat ring 28. O-ring seal 30 is provided around the gate engaging side 31 of seat ring 28 and O-ring seal 32 provides a seal around seat ring 28 and the side of recess 27. Seat ring 28 having O-ring seal 30 engages against the righthand side 34 of the gate to form a seal around flow passage 26 at the seat-gate engagement. Gate 15 has a flow port 35 therethrough which is moved upwardly to be aligned with passage 26 and the opening 28a through seat ring 28 when the gate is moved upwardly to be opened. The Belleville spring 29 serves to maintain seat ring 28 engaged with the gate.

A stepped recess 37 is provided at the opposite side of valve chamber 12, recess 37 being formed in valve body 11 concentrically with formation 23. A valve seat member 38 has outwardly enlarged portion 39 received in the bottom part of recess 37 and has tubular portion 40 of outwardly reduced diameter, tubular portion 40 engaging gate 15 at its end, as shown in FIG. 1. A seal support ring 41, forming the main body portion of the supplemental seal, is disposed around portion 40 of seat 38 within the enlarged portion of recess 37. Element 41, being inwardly relieved at its end toward the gate, is of L-shaped cross section and has a pair of extending portions 42, 43 which extend along the opposite sides of gate 15, as best shown in FIG. 2. Each extending portion 42, 43 has fixed to its flat inwardly facing surface a pin 44 which is of short cylindrical form. Gate 15 has a groove 45 at each of its sides, the two grooves being of mirror image form. Each groove 45 has a vertical portion 45a at its lower end, above which is provided a slanted groove portion 45b and the top portion 45c of each groove is of short vertical form. The pins 44 are received in the grooves 45 at the opposite sides of the gate. When gate 15 is moved downwardly toward closed position by downward movement of stem 14, the pins 44 slidingly move along the grooves 45 from positions 44a (shown out of position) toward positions 44b in the grooves. As long as the pins 44 are in the vertical portions 45a of the grooves 45, the vertical movement of the gate has no effect on the position of element 41. But when the pins reach the slanted groove portions 45b, the pins 44 are moved toward the right by downward gate movement drawing element 41 toward the right as it is shown in FIG. 1. When the pins 44 are moved toward the right by the cam action of grooves 45, the extensions 42, 43 move element 41 toward the gate.

A thin inner ring 47 and a thicker outer ring 48 are disposed within ring 41 outside of seat portion 40, as shown in FIG. 1. An elastomeric sealing element 49 is also disposed within ring 41 and has a tubular flange-like annular formation 50 which is disposed between rings 47 and 48. Movement of element 41 toward the gate causes the sealing element 49 to be compressed and squeezed toward the gate with rings 47, 48, to form a seal against the gate around passage 25.

When gate 15 is moved upwardly to open the valve, to bring gate passage 35 into alignment with body passages 25, 26, the cam action between pins 44 and grooves 45 causes movement of element 41 away from the gate to deactivate the seal formed by seal element 49. The disposition and configuration of the grooves 45 is such that the seal at sealing element 49 is disestablished prior to disestablishment of the metal to metal seal between the gate face and the righthand end of seat element 38, so that high pressure differentials are not imposed across the elastomeric seal.

As should by now be well understood, the seal formed by element 49 in conjunction with the associated ring elements forms a fluid-tight seal surrounding the metal to metal seal between the gate and seat element 38. The preferred direction of fluid flow through the valve is in the direction of arrow 55, FIG. 1. However, the invention may be used as described with fluid flow in either direction through the valve. Valves may be made having dual supplementary seals of the type shown at the lefthand side of the gate in FIG. 1. The seal apparatus shown at the lefthand side of gate 15 of FIG. 1 may be disposed at the righthand side of the gate to replace seat ring 28. As stated earlier, the valve shown in FIG. 1 is of the type known as a rising stem valve. The stem and gate rise together. There is another class of valves known as nonrising stem valves in which the stem is threaded to the gate so that when the stem rotates the stem does not move longitudinally but the gate travels up threads on the stem in one direction and down the threads in the other direction so that the stem is non-rising but the gate moves in the same manner as the gate in a rising stem valve. The invention may equally suitably be used with such a non-rising stem as will be perfectly clear to those skilled in the art.

Referring to FIG. 3 of the drawings, a modified embodiment of the invention is shown wherein the pins 44a are tapered from end to end, as shown, and the sides of the grooves 45d are correspondingly tapered. Pins 44a are, therefore, dovetailed with grooves 45d, whereby it is insured that the pins will remain within the grooves.

While preferred embodiments of the invention have been described and shown in the drawings, many modifications thereof may be made by persons skilled in the art without departing from the spirit of the invention, and it is intended to protect by Letters Patent all forms of the invention falling within the scope of the following claims;

I claim:

1. Gate valve, comprising a valve body having a valve chamber therein, a pair of flow passages through said valve body aligned at opposite sides of said chamber, a gate member within said chamber disposed between said aligned flow passages and being reciprocably movable along a line transverse to said flow passages between a gate position in which said valve is open and a gate position in which said valve is closed, said gate member having a flow passage therethrough which is aligned with said aligned flow passages when said gate is in said position in which said valve is open, said gate having an imperforate portion which is aligned with said aligned flow passages when said gate is in said position in which said valve is closed, said valve body having a recess around the inner end of each of said aligned flow passages, a valve seat in each of said recesses, at least one of said valve seats comprising a ring shaped seat against which said gate slides between said open and closed positions, said gate forming a primary metal to metal seal with said seat around a said flow pressure through said valve body when said gate is in said valve closed position, said seat having an annular recess therearound at its end portion adjacent said gate, a seal support ring having an inner recess therearound at its end portion adjacent said gate and being disposed in said recess of said ring shaped seat, a pair of rings disposed in said inner recess of said seal support ring and being spaced radially apart around said recess of said seat, an elastomeric seal ring disposed between said seat and said seal support ring and extending between said rings of said pair of rings toward said gate, and cam means acting between said seal support ring and said gate for drawing said seal support ring toward said gate when said gate is moved from said valve open position toward said valve closed position to force said elastomeric seal ring into sealing engagement with said gate and for moving said seal support ring away from said gate when said gate is moved from said valve closed position toward said valve open position, whereby said elastomeric seal ring forms a secondary seal between said gate and said seat when said valve is closed and is withdrawn from said gate when said valve is opened, said secondary seal being effected after said primary metal to metal seal has been formed and being released before said primary metal to metal seal has been released, whereby said secondary seal when effected is not subjected to high pressure differentials across said gate.

2. The combination of claim 1, said cam means comprising groove means at the opposite sides of said gate and pin means carried by said seal support ring.

3. The combination of claim 2, said pin means being supported by extensions of said seal support ring at said opposite sides of said gate.

4. Gate valve, comprising a valve body having a valve chamber therewithin and having a ring-shaped seat means disposed in a recess around the inner end of each of a pair of aligned flow passages at opposite sides of said chamber, at least one of said seat means having a secondary seal means therearound, a gate slidably disposed between said seat means and having a flow port therethrough movable with said gate between open and closed positions with respect to said flow passages, each said secondary seal means comprising a ring shaped support element having portions extending along opposite sides of said gate, seal means supported by said ring shaped support element facing said gate, cooperating cam means on said gate and on said extending portions of said ring shaped support element for moving said ring shaped support element toward said gate when said gate is moved toward said closed position to force said seal means against said gate to form a fluid-tight seal around said flow port and for moving said ring shaped support element away from said gate when said gate is moved toward said open position to open said fluid-tight seal.

5. The combination of claim 4, said cam means comprising grooves at the opposite sides of said gate and pin means carried by said extending portions of said ring-shaped support element engaged in said grooves.

6. The combination of claim 5, said grooves and pin means being angular to be dovetailed together whereby said pins are secured against movement out of said grooves.

7. The combination of claim 6, said grooves being inclined toward said one seat means in the direction of movement of said gate toward closed position whereby said pin means move said ring shaped support element toward said gate when said gate is moved toward closed position.

8. The combination of claim 7, said seal means comprising a ring of elastomeric material having an annular flange portion thereof facing said gate, rigid ring means inward and outward of said annular flange portion of said seal means, said ring shaped support element when moved toward said gate tending to extrude said annular flange portion between said rigid ring means toward said gate to enhance said seal formed with said gate.

* * * * *